United States Patent
Woollenweber et al.

[11] Patent Number: 6,145,314
[45] Date of Patent: Nov. 14, 2000

[54] COMPRESSOR WHEELS AND MAGNET ASSEMBLIES FOR INTERNAL COMBUSTION ENGINE SUPERCHARGING DEVICES

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 09/152,448

[22] Filed: Sep. 14, 1998

[51] Int. Cl.[7] .................................................... F02B 37/10
[52] U.S. Cl. ............................. 60/607; 310/156; 417/407
[58] Field of Search .................. 60/607, 398; 123/559.1; 310/156; 417/407

[56] References Cited

U.S. PATENT DOCUMENTS

| | | |
|---|---|---|
| 2,078,499 | 4/1937 | Ljungstrom . |
| 2,173,489 | 9/1939 | Voigt . |
| 2,578,785 | 12/1951 | Davis . |
| 2,649,048 | 8/1953 | Pezzillo et al. . |
| 2,782,721 | 2/1957 | White . |
| 2,829,286 | 4/1958 | Britz . |
| 3,163,790 | 12/1964 | White . |
| 3,557,549 | 1/1971 | Webster . |
| 3,572,982 | 3/1971 | Kozdon . |
| 3,961,199 | 6/1976 | Bronicki . |
| 4,253,031 | 2/1981 | Frister ...................................... 417/407 |
| 4,433,261 | 2/1984 | Nashiki et al. ........................... 310/156 |
| 4,445,337 | 5/1984 | McCreary .................................. 60/608 |
| 4,453,381 | 6/1984 | Dinger ...................................... 60/612 |
| 4,531,071 | 7/1985 | Kintz et al. .............................. 310/156 |
| 4,565,505 | 1/1986 | Woolenweber ........................... 417/407 |
| 4,641,977 | 2/1987 | Woolenweber . |
| 4,708,095 | 11/1987 | Luterek ................................. 123/41.42 |
| 4,708,602 | 11/1987 | McEachern, Jr. et al. .............. 417/407 |
| 4,776,168 | 10/1988 | Woollenweber .......................... 60/602 |
| 4,827,170 | 5/1989 | Kawamura et al. ..................... 310/156 |

(List continued on next page.)

FOREIGN PATENT DOCUMENTS

| | | |
|---|---|---|
| 294985 | 12/1988 | European Pat. Off. . |
| 367406 | 5/1990 | European Pat. Off. . |
| 2479899 | 10/1981 | France . |
| 57-212331 | 12/1957 | Japan . |
| 58-222919 | 12/1983 | Japan . |
| 59-49323 | 3/1984 | Japan . |
| 3202633 | 4/1991 | Japan . |
| 4-112921 | 4/1992 | Japan . |
| 5-5419 | 1/1993 | Japan . |
| 267149 | 8/1927 | United Kingdom . |
| 308585 | 11/1929 | United Kingdom . |

*Primary Examiner*—Michael Koczo
*Attorney, Agent, or Firm*—Brinks Hofer Gilson & Lione

[57] ABSTRACT

An improved supercharging apparatus combines the elements of a rotary electric machine and an air compressor, such as in a turbocharger. A plurality of permanent magnets are encapsulated by a multi-layer carbon filament winding wound around the plurality of permanent magnets for retention of the plurality of magnets as the rotor of an electric motor for driving a charge air compressor for an internal combustion engine. The plurality of permanent magnets are preferably located on an inner core and on a magnet mounting surface formed on the rear face of the compressor wheel of the charge air compressor and spaced intermediately of the shaft portion and periphery of the compressor wheel before encapsulation by winding a carbon filament in a multi-layer coil over the plurality of magnets and the magnet mounting surface of the compressor wheel. Such construction provides, particularly in turbocharger applications, retention of the plurality of magnets against the very high centrifugal forces imposed on the magnets by very high rotational speeds, elimination of the efficiency-robbing eddy currents generated in metallic retainers, an economic production of compressor wheels and magnet motor rotor assemblies for superchargers, and protection of the permanent magnets from high temperatures and high temperature gradients.

14 Claims, 3 Drawing Sheets

U.S. PATENT DOCUMENTS

| | | | |
|---|---|---|---|
| 4,850,193 | 7/1989 | Kawamura | 60/608 |
| 4,878,347 | 11/1989 | Kawamura | 60/608 |
| 4,882,905 | 11/1989 | Kawamura | 60/608 |
| 4,885,911 | 12/1989 | Woollenweber et al. | 60/597 |
| 4,894,991 | 1/1990 | Kawamura | 60/608 |
| 4,901,530 | 2/1990 | Kawamura | 60/608 |
| 4,918,923 | 4/1990 | Woollenweber et al. | 60/614 |
| 4,935,656 | 6/1990 | Kawamura | 310/156 |
| 4,955,199 | 9/1990 | Kawamura | 60/608 |
| 4,958,497 | 9/1990 | Kawamura | 60/608 |
| 4,958,708 | 9/1990 | Kawamura . | |
| 4,981,017 | 1/1991 | Hara et al. | 60/608 |
| 4,998,951 | 3/1991 | Kawamura | 60/608 |
| 5,025,629 | 6/1991 | Woollenweber | 60/600 |
| 5,038,566 | 8/1991 | Hara | 60/608 |
| 5,074,115 | 12/1991 | Kawamura | 60/608 |
| 5,088,286 | 2/1992 | Muraji | 60/608 |
| 5,094,587 | 3/1992 | Woollenweber | 417/107 |
| 5,121,605 | 6/1992 | Oda et al. | 60/608 |
| 5,176,509 | 1/1993 | Schmider et al. | 417/423.7 |
| 5,406,797 | 4/1995 | Kawamura | 60/608 |
| 5,423,304 | 6/1995 | Lawrence et al. | 123/559.1 |
| 5,485,045 | 1/1996 | Canders et al. | 310/156 |
| 5,486,730 | 1/1996 | Ludwig et al. | 310/156 |
| 5,560,208 | 10/1996 | Halimi et al. | 60/608 |
| 5,605,045 | 2/1997 | Halimi et al. | 60/607 |
| 5,857,332 | 1/1999 | Johnston et al. | 60/607 |
| 5,870,894 | 2/1999 | Woollenweber et al. | 60/607 |

COMPRESSOR WHEELS AND MAGNET ASSEMBLIES FOR INTERNAL COMBUSTION ENGINE SUPERCHARGING DEVICES

FIELD OF THE INVENTION

This invention relates generally to supercharging apparatus for use with internal combustion engines, and more particularly to compressor and turbocharger apparatus having an integral electric motor and to methods for combining the electric motor elements in supercharging devices such as in a turbocharger or compressor.

BACKGROUND OF THE INVENTION

Turbochargers and charge air compressors are well known and widely used with internal combustion engines. Generally, such devices supply more charge air for the combustion process than can otherwise be induced through natural aspiration. This increased air supply allows more fuel to be burned, thereby increasing power and torque obtainable from an engine having a given displacement. Additional benefits include the possibility of using lower-displacement, lighter engines with corresponding lower total vehicle weight to reduce fuel consumption, and use of available production engines to achieve improved performance characteristics. In some applications an intercooler is incorporated for removing heat (both an ambient heat component and heat generated during charge air compression) from the charge air before it enters the engine, thereby providing an even more dense air charge to be delivered to the engine cylinders. Intercooled turbocharging applied to diesel engines has been known to at least double the power output of a given engine size, in comparison with naturally aspirated diesel engines of the same engine displacement.

Additional advantages of turbocharging include improvements in thermal efficiency through the use of some energy of the exhaust gas stream that would otherwise be lost to the environment, and the maintenance of sea level power ratings up to high altitudes.

At medium to high engine speeds, there is an abundance of energy in the engine exhaust gas stream and, over this operating speed range, the turbocharger is capable of supplying the engine cylinders with all the air needed for efficient combustion and maximum power and torque output for a given engine construction. In certain applications, however, an exhaust stream waste gate is needed to bleed off excess energy in the engine exhaust stream before it enters the turbocharger turbine to prevent the engine from being overcharged. Typically, the waste gate is set to open at a pressure below which undesirable predetonation or an unacceptably high internal engine cylinder pressure may be generated.

At low engine speeds, such as idle speed, however, there is disproportionately little energy in the exhaust stream as may be found at higher engine speeds, and this energy deficiency prevents the turbocharger from providing a significant level of boost in the engine intake air system. As a result, when the throttle is opened for the purpose of accelerating the engine from low speeds, such as idle speed, there is a measurable time lag and corresponding performance delay, before the exhaust gas energy level rises sufficiently to accelerate the turbocharger rotor and provide the compression of intake air needed for improved engine performance. The performance effect of this time lag may be pronounced in smaller output engines which have a relatively small amount of power and torque available before the turbocharger comes up to speed and provides the desired compression. Various efforts have been made to address this issue of time lag, including reductions of inertia of turbocharger rotors.

In spite of evolutionary design changes for minimizing the inertia of the turbocharger rotor, however, the time lag period is still present to a significant degree, especially in turbochargers for use with highly rated engines intended for powering a variety of on-highway and off-highway equipment.

Furthermore, to reduce exhaust smoke and emissions during acceleration periods when an optimal fuel burn is more difficult to achieve and maintain as compared with steady-speed operation, commercial engines employ devices in the fuel system to limit the fuel delivered to the engine cylinders until a sufficiently high boost level can be provided by the turbocharger. These devices reduce excessive smoking, but the limited fuel delivery rate causes a sluggishness in the response of the engine to speed and load changes.

The turbo-lag period can be mitigated and, in many instances, virtually eliminated by using an external power source to assist the turbocharger in responding to engine speed and load increases. One such method is to use an external electrical energy supply, such as energy stored in d.c. batteries, to power an electric motor attached to the turbocharger rotating assembly. The electric motor can be external and attached to the turbocharger rotor through a clutching mechanism, or it can be added onto the turbocharger rotating assembly and energized and de-energized through the use of appropriate electronic controls. For example, a plurality of permanent magnets may be attached to the rotatable shaft of a turbocharger to provide an electric motor rotor and a plurality of stator windings may be incorporated into the turbocharger around the rotor magnets. Energization of the stator windings with polyphase electrical energy can drive the permanent magnet rotor in rotation when additional charge air is needed. Patents disclosing turbocharger-electrical machine combinations include U.S. Pat. Nos. 5,406,797; 5,038,566; 4,958,708; 4,958,497; 4,901,530; 4,894,991; 4,882,905; 4,878,347 and 4,850,193.

The very hot and high centrifugal force environments of turbochargers and charge air compressors are hostile to electrical motor elements, such as permanent magnets and electrically insulated stator windings. The attachment of the permanent magnets to the turbocharger shaft subjects the magnets to heat which is conducted along the shaft from the hot turbine wheel of the turbocharger. This presents a significant problem in that the permeability of the magnets may be reduced by such heating to a level which may be unacceptable for efficient operation of the rotary electric machine. In addition, the very high temperatures generated in operation of a turbocharger endangers the integrity of stator winding electrical insulation. This becomes a serious problem when the turbocharged engine is subjected to a hot shutdown and the oil flow through the bearings and over the shaft is interrupted. High temperatures and steep temperature gradients will exist for a significant length of time while the hot parts of the turbocharger are drained of their heat content. Furthermore, turbochargers and charge air compressors rotate at very high speeds, and frequently at speeds in excess of 60,000 to 80,000 rpm. The machine elements exposed to such very high speeds of rotation are subjected to very high centrifugal forces.

SUMMARY OF THE INVENTION

In the invention, a plurality of permanent magnets are encapsulated by a multi-layer carbon filament winding wound around the plurality of permanent magnets for retention of the plurality of magnets as the rotor of an electric motor for driving a charge air compressor for an internal combustion engine. In the invention the plurality of permanent magnets are preferably located on an inner core and on a magnet mounting surface formed on the rear face of the compressor wheel of the charge air compressor and spaced intermediately of the shaft portion and periphery of the compressor wheel before encapsulation by winding a carbon filament in a multi-layer coil over the plurality of magnets and the magnet mounting surface of the compressor wheel. The invention provides, particularly in turbocharger applications, retention of the plurality of magnets against the very high centrifugal forces imposed on the magnets by very high rotational speeds, elimination of the efficiency-robbing eddy currents generated in metallic retainers, an economic production of compressor wheels and magnet motor rotor assemblies for superchargers, and protection of the permanent magnets from high temperatures and high temperature gradients.

In preferred turbocharger embodiments of the invention, the plurality of permanent magnets are positioned and retained where they are less exposed to the heat generated in operation of the turbocharger. One advantageous location is on the rear face of the aluminum compressor wheel located intermediate the compressor wheel shaft and periphery. During operation of the turbocharger, ambient air enters the compressor wheel intake and is not heated appreciably by the compression process until the air reaches the outer portion of the compressor wheel and the compressor wheel is maintained at acceptable temperatures. In the event of a hot shutdown, the compressor wheel vanes act to radiate heat out of the hub area and the temperature in the hub will be near the low end of the gradient between the hot turbine parts and ambient conditions, and the magnets are maintained at acceptable operating temperatures in such preferred embodiments.

Such permanent magnet rotor assemblies are driven by a plurality of stator windings located adjacent the plurality of permanent magnets and energized by a polyphase alternating current source. For example, stator or motor windings can be mounted in a housing, radially outwardly of the encapsulated magnets retained for rotation with the compressor wheel and the housing can be adapted for cooling the stator windings with a cooling fluid. When the stator windings are energized by the polyphase alternating current source, a rotating electromagnetic force field is generated adjacent the motor magnets, and the resulting magnetic interaction applies a torque for rotation of the compressor wheel.

Further features and advantages of the invention will be apparent from the drawings and more detailed description that follows.

DETAILED DESCRIPTION OF THE PREFERRED EMBODIMENTS

Figure 1:
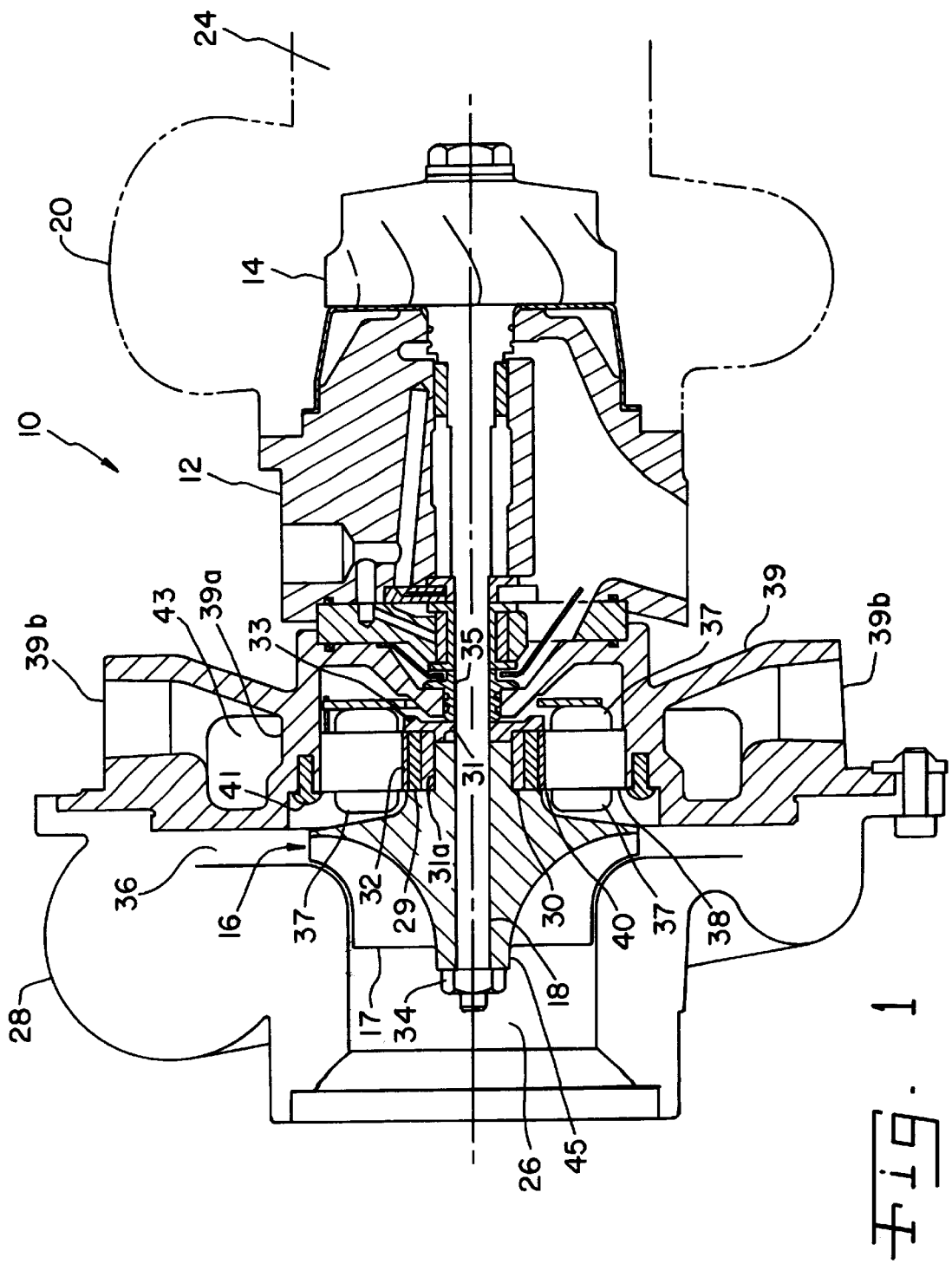
FIG. 1 is a cross-sectional view of one embodiment of a turbocharger apparatus of the present invention taken at a plane through the longitudinal axis of the shaft of the turbocharger.

Referring now to the drawings, and particularly to FIG. 1, a turbocharger 10 combines the elements of a rotary electric machine and a turbocharger in accordance with the invention. The turbocharger 10 includes a housing 12 for supporting a multi-vaned exhaust gas turbine wheel 14 and an air charging compressor wheel 16 having a plurality of vanes 17 mounted on the opposite ends of a common connecting shaft 18. The turbine includes a turbine housing 20 (shown in dashed lines) which, as known in the art, has an exhaust stream inlet scroll that is connected to receive exhaust gas from an internal combustion engine and is frequently divided into two sections, each section receiving exhaust gas from a different set of engine cylinders (not shown). The exhaust gas is directed and drives the turbine wheel 14 and shaft 18 in rotation. After passing through the turbine wheel 14, the exhaust gas stream flows out of the turbocharger through an exhaust vent 24.

Rotation of shaft 18 rotates the attached compressor wheel 16 at the opposite end of the connecting shaft 18, and combustion air is drawn in through an air intake opening 26 formed in a compressor casing 28 after passing through an appropriate filter (not shown) to remove contaminants. The compressor casing 28 includes a scroll, as known in the art, for directing the compressed combustion air to an engine intake manifold (not shown). The compressor wheel 16 is secured on the rotating shaft 18 between a lock nut 34 and one or more sleeves 35. The in-flowing combustion air is compressed by the driven compression wheel vanes 17, which are formed on a front face of the compressor wheel 16. After being compressed by the compressor wheel 16, the compressed combustion air is directed through the scroll of the compressor casing 28 and is delivered to the intake manifold system of the engine.

According to the invention, the compressor wheel assembly of FIG. 1 consists of compressor wheel 16, a plurality of permanent magnets 29 attached to an inner core 30, which is mounted on a compressor wheel magnet mounting surface, such as hub extension 31. A carbon filament composite winding 32 is used to support the magnets against centrifugal force due to the high speed of rotation of the turbocharger rotor assembly. An end piece 33 is used to encapsulate the magnets and completes the compressor wheel-magnet rotor assembly that is secured on the rotating shaft 18 between a lock nut 34 and a sleeve 35.

The stator of an electric motor consists of coils 37 of an electrical conductor, such a copper wire, wound around a laminated steel core 38 and is located in a fluid-cooled motor housing 39 which is separate from the turbocharger housing 12 and is provided with a flew of through openings 396 cooling fluid from the cooling system of the internal combustion engine. The motor housing 39 is formed with a cavity 43 for cooling fluid that surrounds the stator coils 37 in heat transfer relationship, that is, heat loss from stator coils 37 is conducted through the wall portion 39a of the motor housing for transfer to cooling fluid in cavity 43. An air gap 40 is provided between the carbon filament winding 32 and the inner diameter of the motor stator laminated core 38 to provide the necessary running clearance and prevent any physical contact there between. The motor stator core 38 is held in place in the motor housing 39 by retaining screws 41. The connection for the coils 37 are led through an opening (not shown) in motor housing 39 to an appropriate electronic control and polyphase power supply. As known in the art, at least one Hall effect sensor can be provided in the stator and connected with the control and polyphase power supply for detecting rotational speed and position of the magnets and indicating the polyphase power is to be supplied to the stator windings for rotation of the assembly.

The compressor wheel-magnet rotor assembly of FIG. 1 is unique in construction. The magnets 29 are cemented to the inner core 30 and are encapsulated by being press-fitted to the compressor wheel hub extension 31, and are retained axially by an end piece 33, which can also be press-fitted into the inner core 30. (See FIG. 4) Encapsulation of the permanent magnets is completed by the addition of the carbon filament composite winding 32 which is wound around the permanent magnets 29, inner core 30 and compressor wheel extension 31 in the form of a multi-layer coil. The compressor wheel assembly is then is dynamically balanced by removal of metal from the rim of the end piece 33 and from the front nose area 45 of the compressor wheel before being assembled onto the turbocharger rotating assembly.

Figure 2:
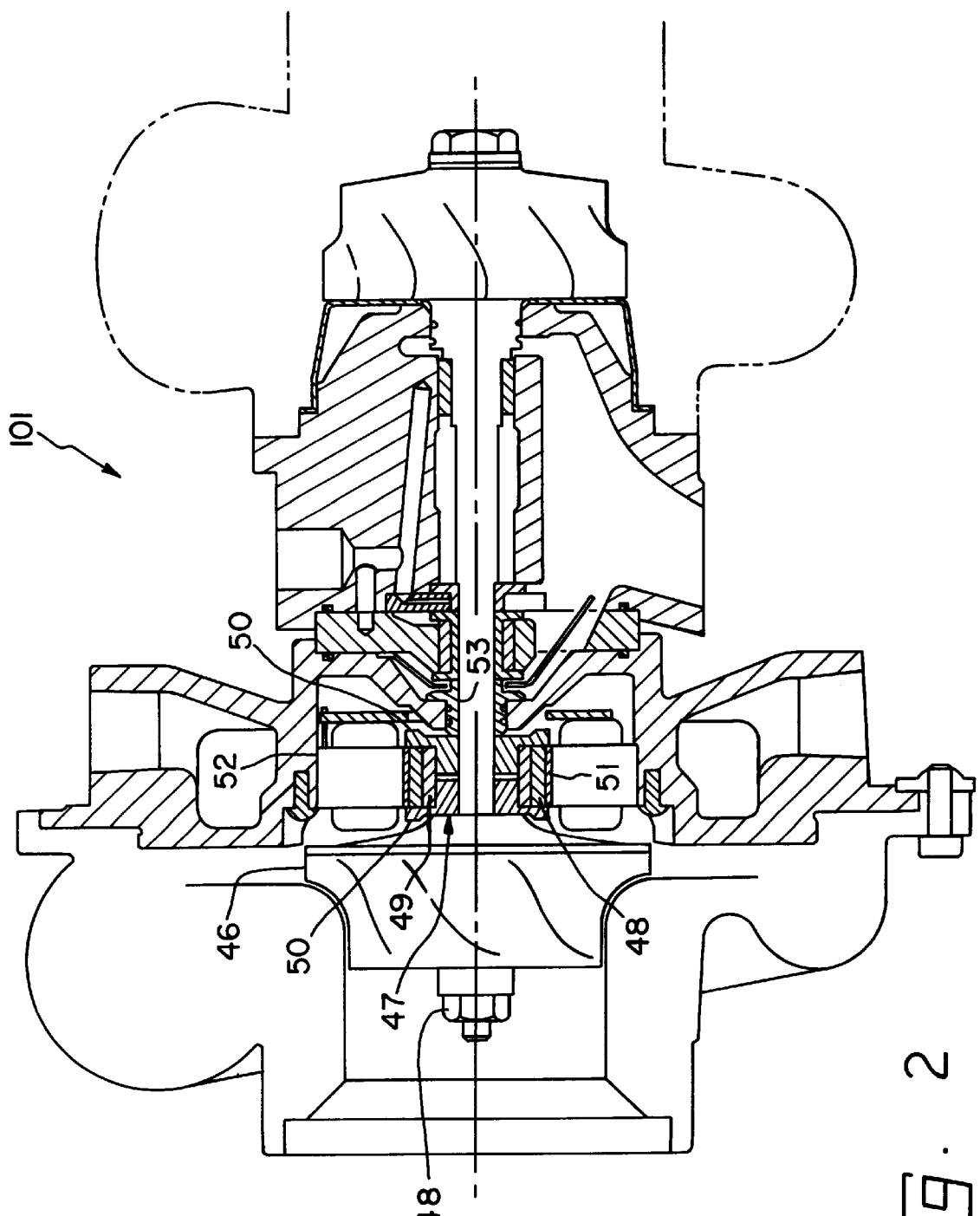
FIG. 2 is a cross-sectional view of another embodiment of the turbocharger apparatus of the invention taken at a plane through the longitudinal axis of the shaft of the turbocharger.

Referring now to FIG. 2, the turbocharger 101 is essentially the same as previously described in FIG. 1. In the embodiment of the invention illustrated in FIG. 2, a magnet assembly 47 is separate from the compressor wheel 46 and is removably mounted on the turbocharger rotating assembly adjacent to and clamped by the compressor wheel 46 against sleeve 53 by the rotor lock nut 48. The magnet assembly 47 comprises a plurality of magnets 48 cemented to an inner core 49 and enclosed by the two end pieces 50. A carbon filament composite 51 is wound around the outside diameter of the plurality of magnets 48 in a multi-layer coil to encapsulate and to constrain them against centrifugal force. As with the rotating assembly of FIG. 1 the magnet assembly can be dynamically balanced by removal of material from end pieces 50. The stator assembly of FIG. 2 is essentially the same as described in FIG. 1.

Figure 3:
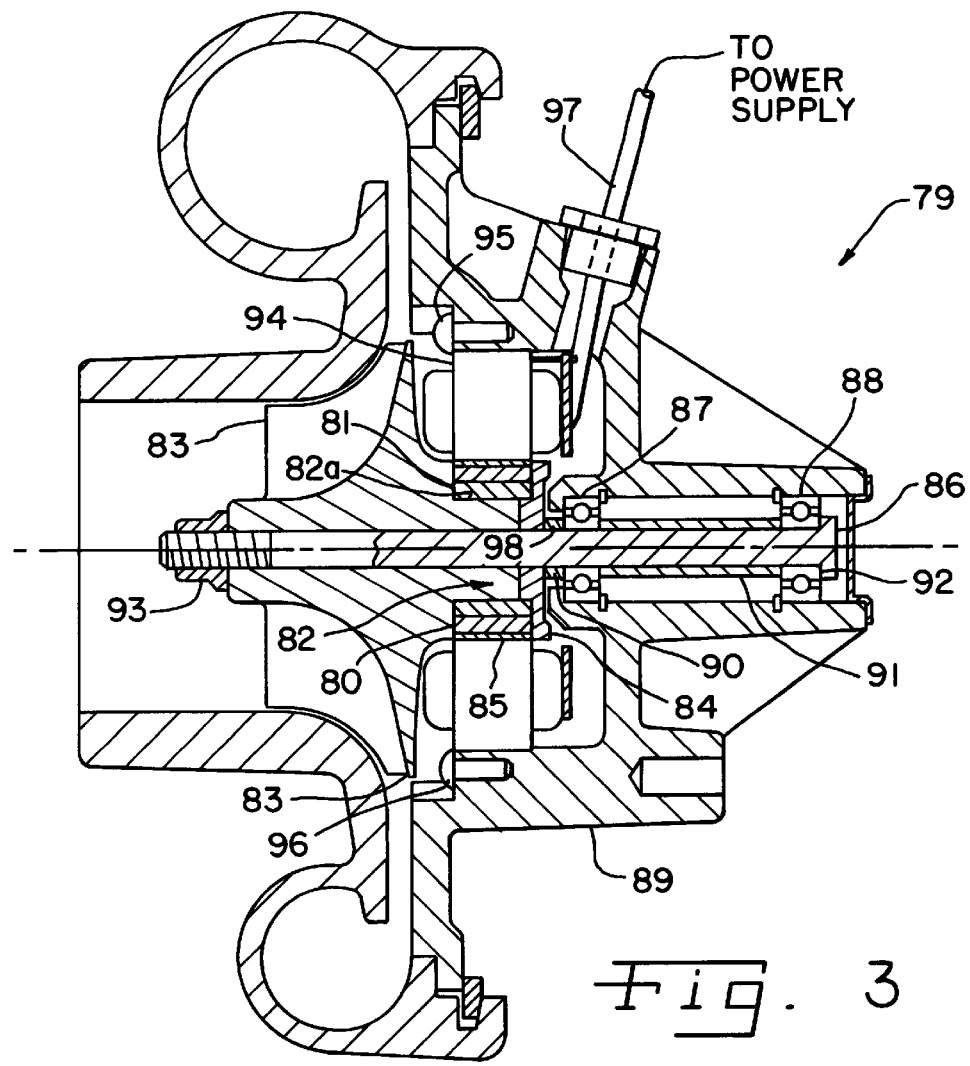
FIG. 3 is a cross-sectional view of a compressor apparatus of the invention taken at a plane through the longitudinal axis of the shaft of the turbocharger.

FIG. 3 illustrates another embodiment of the present invention in which motor and compressor elements are combined in an integrated structure providing a compact motor-driven compressor 79 that can be used as a supercharging device for internal combustion engines. In the same manner as in FIG. 1 and FIG. 4, a plurality of magnets 80 are cemented to an inner core 81, which is pressed onto the magnet mounting surface protrusion 82 of the compressor wheel 83. As in FIG. 1, an end piece 84 is used to encapsulate the magnets 80, and a carbon filament composite 85 is wound around the outside diameter of the magnets 80 in a multi-layer coil to encapsulate the plurality of permanent magnets and retain them against centrifugal force. The compressor wheel-magnet assembly is mounted on shaft 86, which is carried by ball bearings 87 and 88 secured in motor housing 89. The inner races of ball bearings 87 and 88, sleeves 90 and 91, and the compressor wheel-magnet rotor assembly 92 are clamped against the shoulder 92 of shaft 86 by rotor lock nut 93. Motor stator 94 is retained in the motor housing 89 by screws 95 and 96. The stator winding wires 97 are led out from the motor housing 89 to an appropriate electronic controller and power supply (not shown).

Figure 4:
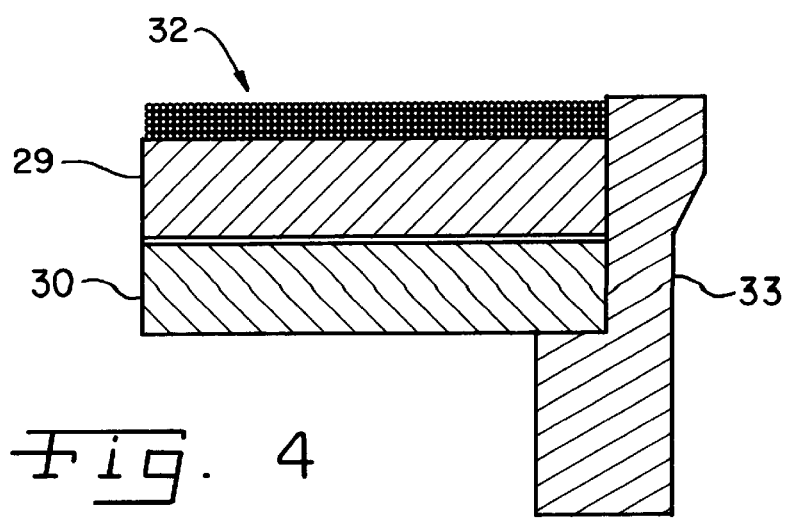
FIG. 4 is a diagrammatic illustration, in cross section, showing magnets, an inner core, an affixed end piece and a multi layer carbon filament composite winding.

As illustrated in FIGS. 1 and 3, the compressor wheel magnet mounting surface is preferably formed to extend from the rear face of the compressor wheel 16, 83 at a location spaced radially outwardly from its center, preferably as an axially extending projection 31, 82 including an annular ledge 31a, 82a for mounting the magnets. FIG. 4 illustrates diagrammatically the encapsulation of a plurality of magnets 29 (and 80) on an inner core 30 (and 81) within an affixed end piece 33 (and 84) by a multi-layer carbon filament winding 32 (and 85). In the preferred embodiments of FIGS. 1 and 3, such magnet assemblies are mounted on annular ledges 31a, 82a. In the FIG. 2 embodiment end pieces are affixed at each end of the inner core of the magnet assembly.

In a still further embodiment, the magnet assembly 47 of FIG. 2 may be used in the compact motor-driven compressor, such as that shown in FIG. 3, by locating it between the compressor wheel 83 (with protrusion 82 removed) and short sleeve 90 on the shaft 86.

Encapsulation of the permanent magnets by a multi-layer winding of a carbon filament provides an effective retention of the plurality of magnets to the rotating assembly without the generation of eddy current losses, economic manufacture of reliable motor-assisted supercharging devices and contributes to the location of the assisting electric motor elements where they are protected from high operating temperatures.

Although preferred embodiments of the invention have been described herein, it will be apparent to those skilled in the art to which the invention that variations and modifications of the described embodiments may be made without departing from the spirit and scope of the invention. Accordingly, it is intended that the invention be limited only to the extent required by the appended claims and prior art.

We claim:

1. A turbocharging device for use with an internal combustion engine, comprising:

a turbocharger housing;

a shaft rotatably supported by said housing and carrying a charge air compressor wheel and an exhaust gas turbine wheel;

an exhaust gas intake adjacent said exhaust gas turbine wheel to direct exhaust gas flow to said turbine wheel;

a combustion air intake adjacent to said combustion air compressor wheel to direct ambient air to said compressor wheel;

a plurality of permanent magnets located on the compressor wheel and retained for rotation with the compressor wheel by a multi-layer carbon fiber winding over said plurality of permanent magnets; and a plurality of stator windings carried by said turbocharger housing adjacent to the compressor wheel, wherein the plurality of permanent magnets are retained on an inner core with an affixed end piece by said multi-layer, carbon fiber winding, and said inner core is press fitted on an axially extending projection formed on the rear of the compressor wheel.

2. The turbocharging device of claim 1, wherein said plurality of stator windings is carried by the housing radially outwardly of and substantially around the permanent magnets.

3. The turbocharging device, of claim 1, wherein the compressor wheel includes a front face for supporting a plurality of compression vanes, and said axially extending projection is radially spaced from the shaft for location of said plurality of permanent magnets.

4. A compressor device for use with an internal combustion engine, comprising:

a compressor housing;

a rotatable shaft supported by said housing carrying a combustion air compressor wheel;

a combustion air intake adjacent to said combustion air compressor wheel to direct ambient air to said compressor wheel; and a brushless assisting electric motor incorporating said compressor wheel, and comprising a plurality of permanent magnets and an inner core with an affixed end piece located on the compressor wheel and retained for rotation with the compressor wheel by a surrounding multi-layer, carbon filament winding, and a plurality of stator windings provided adjacent to the plurality of permanent magnets, said plurality of stator windings being energizable to rotate said compressor wheel and produce a flow of compressed air from the compressor wheel.

5. The compressor device of claim 4, wherein the compressor wheel includes a front face for supporting a plurality of compression vanes, and a rear face having an axially extending shoulder radially spaced from the shaft for location of said plurality of permanent magnets.

6. The compressor device of claim 1 wherein said inner core is press fitted on an axially extending projection formed on the rear of the compressor wheel.

7. In a process for making a supercharger for an internal combustion engine including a compressor wheel, wherein a plurality of permanent magnets are attached for rotation with the compressor wheel, the improvement comprising locating a plurality of permanent magnets on an inner core, fastening the inner core on an annular ledge spaced radially outwardly of the center of the compressor wheel, and retaining the plurality of permanent magnets on the inner core by encapsulating the plurality of permanent magnets with a multi-layer carbon filament winding around the plurality of permanent magnets and the inner core.

8. The improvement of claim 7 wherein said permanent magnets are located circumferentially around said compressor wheel on said annular ledge and a plurality of stator windings are located radially outwardly of said permanent magnets.

9. A compressor wheel for an internal combustion engine supercharging device, comprising an aluminum disk adapted for rotation about its center, having a front face formed with a plurality of air compressing vanes and a back face formed with an axially extending projection as a magnet mounting surface, said magnet mounting surface being radially spaced intermediate the center and periphery of the aluminum disk, a plurality of magnets located on the magnet mounting surface of the aluminum disk, and a multi-layer carbon filament magnet retainer wound around the plurality of magnets and the magnet mounting surface of the aluminum disk to secure the plurality of magnets in location on the back face of the aluminum disks, wherein the plurality of magnets are cemented to an inner core, said inner core being fitted to the axially-extending projection and said multi-layer carbon filament retainer being wound over the plurality of magnets and inner core.

10. The compressor wheel of claim 9 further comprising an end piece press fit into the inner core.

11. The compressor wheel of claim 9 wherein at least one end piece is fastened to said inner core at one of its ends, said at least one end piece having an outer diameter exceeding the thickness of the multi-layer carbon filament winding and permitting removal of portions for dynamic balancing the compressor wheel assembly.

12. In a process of manufacture of a motor-assisted supercharging device, the improvement comprising adhesively attaching a plurality of permanent magnets to the outer surface of a tubular inner core, press fitting at least one end piece to one end of the inner core, and winding a carbon filament around the plurality of permanent magnets and inner core in a plurality of layers.

13. The improvement of claim 12 wherein an end piece is press fitted to the other end of the inner core before winding the carbon filament around the plurality of magnets and inner core.

14. The improvement of claim 12 wherein the inner core is press fitted to a magnet locating surface on the back of a compressor wheel before winding the carbon filaments around the plurality of magnets and inner core.

* * * * *